US011048915B2

United States Patent
Rieul et al.

(10) Patent No.: US 11,048,915 B2
(45) Date of Patent: Jun. 29, 2021

(54) METHOD AND A DEVICE FOR DETECTING FRAUD BY EXAMINATION USING TWO DIFFERENT FOCAL LENGTHS DURING AUTOMATIC FACE RECOGNITION

(71) Applicant: SAFRAN IDENTITY & SECURITY, Issy les Moulineaux (FR)

(72) Inventors: François Rieul, Issy les Moulineaux (FR); Jean Beaudet, Issy les Moulineaux (FR); Baptiste Chu, Issy les Moulineaux (FR)

(73) Assignee: Safran Identity & Security, Issy les Moulineaux (FR)

( * ) Notice: Subject to any disclaimer, the term of this patent is extended or adjusted under 35 U.S.C. 154(b) by 0 days.

(21) Appl. No.: 15/637,776

(22) Filed: Jun. 29, 2017

(65) Prior Publication Data
US 2018/0005020 A1  Jan. 4, 2018

(30) Foreign Application Priority Data
Jun. 29, 2016  (FR) ...................................... 16 56121

(51) Int. Cl.
*G06K 9/00* (2006.01)
*G06K 9/20* (2006.01)
(Continued)

(52) U.S. Cl.
CPC ......... *G06K 9/00281* (2013.01); *G06F 21/32* (2013.01); *G06K 9/00255* (2013.01);
(Continued)

(58) Field of Classification Search
CPC ........... G06K 9/00255; G06K 9/00281; G06K 9/00288; G06K 9/00899; G06K 9/00912;
(Continued)

(56) References Cited

U.S. PATENT DOCUMENTS

| 8,752,145 B1 * | 6/2014 | Dotan | ................. | H04L 63/0861 726/6 |
| 8,958,607 B2 * | 2/2015 | Juveneton | .............. | G06N 20/00 382/117 |

(Continued)

FOREIGN PATENT DOCUMENTS

WO  WO2016/084072 A1  6/2016

OTHER PUBLICATIONS

Patel et al. ("Live face video vs spoof face video: Use of Moiré patterns to detect replay video attacks," IEEE International Conference on Biometrics, May 2015).*
(Continued)

*Primary Examiner* — Yubin Hung
(74) *Attorney, Agent, or Firm* — Muncy, Geissler, Olds & Lowe, P.C.

(57) ABSTRACT

A method and an associated device for detecting fraud during automatic face recognition, the method comprising the following steps: acquiring a first image of the face by means of a first sensor having a first field angle, and a second image of the face by means of a second sensor having a second field angle that is narrower than the first field angle; analyzing the first image to verify that there is no frame around the face; and analyzing the second image to verify that there is no moiré effect.

11 Claims, 1 Drawing Sheet

(51) Int. Cl.
*G06F 21/32* (2013.01)
*G06K 9/34* (2006.01)
*G06F 21/10* (2013.01)

(52) U.S. Cl.
CPC ..... *G06K 9/00288* (2013.01); *G06K 9/00899* (2013.01); *G06K 9/00912* (2013.01); *G06K 9/209* (2013.01); *G06K 9/34* (2013.01); *G06F 21/10* (2013.01)

(58) Field of Classification Search
CPC .. G06K 9/209; G06K 9/34; G06F 1/32; G06F 21/10; G06F 21/32
See application file for complete search history.

(56) References Cited

U.S. PATENT DOCUMENTS

| | | | | |
|---|---|---|---|---|
| 9,087,297 | B1* | 7/2015 | Filippova | G06K 9/00718 |
| 2008/0080748 | A1* | 4/2008 | Sukegawa | G06K 9/00885 |
| | | | | 382/118 |
| 2011/0234881 | A1* | 9/2011 | Wakabayashi | H04N 5/23296 |
| | | | | 348/333.05 |
| 2012/0026366 | A1* | 2/2012 | Golan | H04N 5/23248 |
| | | | | 348/240.2 |
| 2012/0195475 | A1* | 8/2012 | Abiko | G06K 9/00093 |
| | | | | 382/115 |
| 2013/0215275 | A1 | 8/2013 | Berini et al. | |
| 2013/0286256 | A1* | 10/2013 | Choi | H04N 5/23219 |
| | | | | 348/240.2 |
| 2015/0310259 | A1* | 10/2015 | Lau | G06K 9/00288 |
| | | | | 382/118 |
| 2015/0334567 | A1* | 11/2015 | Chen | G06T 7/246 |
| | | | | 455/411 |
| 2016/0071275 | A1 | 3/2016 | Hirvonen | |
| 2016/0286127 | A1* | 9/2016 | Zhao | H04N 5/2351 |
| 2016/0328621 | A1* | 11/2016 | Negi | G06K 9/4604 |
| 2019/0026544 | A1* | 1/2019 | Hua | A61B 5/1128 |

OTHER PUBLICATIONS

Garcia et al. ("Face-Spoofing 2D-Detection Based on Moiré-Pattern Analysis," IEEE Transactions on Information Forensics and Security, vol. 10, Issue 4, Apr. 2015).*

Komulainen et al. ("Face spoofing detection using dynamic texture," ACCV 2012 Workshops, Part I, LNCS, vol. 7728, pp. 146-157, 2013).*

Komulainen et al., "Complementary countermeasures for detecting scenic face spoofing attack," IEEE International Conference on Biometrics, Jun. 2013, cited only to show the general knowledge in the art.).*

Biswas et al. ("Efficient live face detection to counter spoof attack in face recognition systems," SPIE Proceedings vol. 9477, Optical Pattern Recognition XXVI (2015)).*

Dong et al. ("A Design of Iris Recognition System at a Distance," Chinese Conference on Pattern Recognition, Nov. 4-6, 2009) (Year: 2009).*

Patel et al., "Secure Face Unlock: Spoof Detection on Smartphones", IEEE Transactions on Information Forensics and Security, vol. 11, No. 10, Oct. 2016, pp. 2268-2283.

* cited by examiner

METHOD AND A DEVICE FOR DETECTING FRAUD BY EXAMINATION USING TWO DIFFERENT FOCAL LENGTHS DURING AUTOMATIC FACE RECOGNITION

The invention relates to the field of automatic face recognition for the purposes of identification or authorization of access to a protected location or to sensitive information contained in a computer device.

BACKGROUND OF THE INVENTION

Biometric recognition techniques are known for their high level of reliability due to the fact that every person possesses unique biometric characteristics.

Automatic face recognition, also referred to as facial recognition, forms part of the various techniques used. The basic technique consists in capturing an image of the face and then processing it by computer to extract data for comparison with data from a database of identified people.

The development of optical sensors and of computer components adapted to biometric recognition makes it possible for biometric recognition technology to be in common use today.

By way of example, this applies to telecommunications terminals of the smartphone type that use the front camera of the device to capture the image of a user so as to authorize unlocking of the device if the characteristics of the face in the captured image correspond to those of a person stored in a memory of the terminal.

Biometric face recognition systems are the subject of attempted fraud with a view to impersonating an authorized user, e.g. in order to access data or a location without authorization.

One of the methods used by fraudulent users to fool biometric recognition systems consists in placing in front of the optical sensor a stationary or moving image of a face belonging to an accredited person. The image used to be printed, but it is now merely displayed on the screen of an electronic device of the smartphone, multimedia tablet, or computer type.

Since programs exist that enable frames or screen borders to be detected, the fraudulent user makes sure that the edges of the screen are not visible to the optical sensor by adjusting the size of the face displayed on the screen and the distance between the screen and the sensor.

In addition, electronic equipment is known comprising both an optical sensor having a field of view that is relatively narrow in order to take images of the portrait type and also an optical sensor having a field of view that is relatively wide in order to take images of groups of people.

OBJECT OF THE INVENTION

An object of the invention is to make secure automatic face recognition.

SUMMARY OF THE INVENTION

To this end, the invention provides an automatic face recognition method, the method comprising, during a fraud detection stage, the following steps:

acquiring at least one first image of the face by means of a first sensor having a first field angle;

substantially simultaneously, acquiring at least one second image of the face by means of a second sensor having a second field angle, the sensors having fields of view covering a common zone in three-dimensional space and the first field angle being wider than the second field angle;

analyzing the first image to verify that there is no border around the face;

analyzing the second image to verify that there is no moiré effect; and detecting the absence of fraud when there is no frame and no moiré effect.

Thus, two images with different fields of view are captured at substantially the same moment (where "substantially simultaneously" means that the two images are captured simultaneously or with an offset of less than a few tenths of a second). The first image makes it possible to detect a possible screen border around a face and the second image makes it possible to distinguish a moiré effect in the image, which moiré effect is characteristic of an image displayed on a screen. Even if the fraudulent user gets close enough to the screen of the image sensor for the edges of the screen not to be visible in the images taken, the analysis of the second image will reveal that the face presented in front of the sensor is an image displayed on a screen.

According to an advantageous characteristic the method comprises a recognition stage, the stage being performed by analyzing the second image taken by means of the second sensor.

The invention also provides an image capture device, comprising a control unit connected both to a first image sensor having a first field angle and also to a second image sensor having a second field angle. The sensors are pointed to have fields of view covering a common zone in three-dimensional space (i.e. although the fields of view are different, they share a common zone), the first field angle being wider than the second field angle. The control unit is arranged to implement the method of the invention.

Other characteristics and advantages of the invention appear on reading the following description of a particular, non-limiting embodiment of the invention.

DETAILED DESCRIPTION OF THE INVENTION

Figure 1:
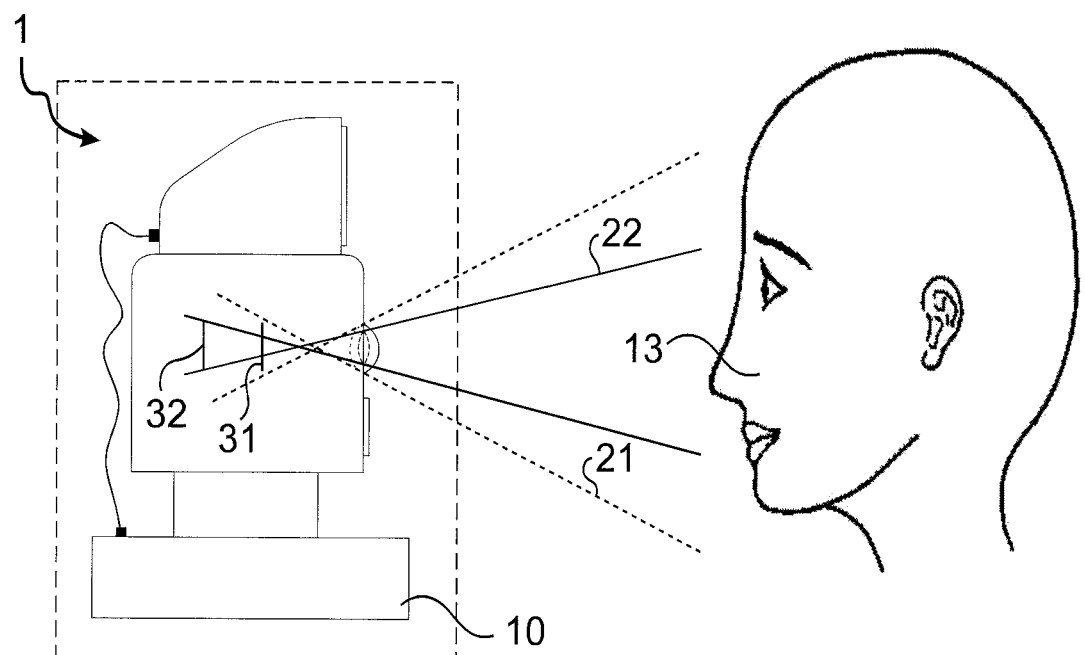
FIGS. 1 and 2 each show a block diagram of an image capture device of the invention.
Figure 2:
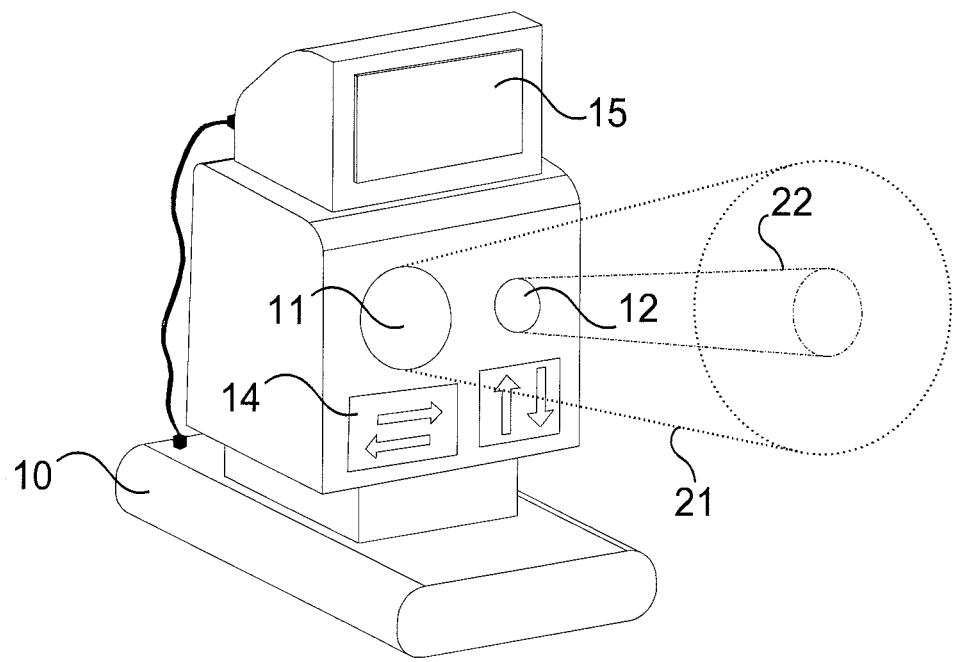

With reference to the figures, the face recognition image capture device of the invention comprises a housing 1 defining a capture zone and containing a control unit 10 connected both to a first image sensor 11 and also to a second image sensor 12.

In known manner, the housing 1 is a unit that may be supported on a wall at head height.

In this embodiment, the first image sensor 11 has a first field angle 21 and the second image sensor 12 has a second field angle 22 in such a manner that the image sensors 11 and 12 have fields of view covering a common zone in three-dimensional space and that the fields of view are oriented and centered in the direction of the position of the head of a candidate appearing in front of the device.

The first field angle 21 is wider than the second field angle 22.

The first image sensor 11 has an image resolution 31. The second image sensor 12 has an image resolution 32 that is specifically adapted to enable a moiré effect to be detected in the images it provides.

The control unit 10 comprises a microcontroller that comprises a processor, a random access memory (RAM), a read-only memory (ROM), and at least one input/output interface. The control unit 10 is arranged to execute an image-processing program making it possible to detect a moiré effect or interference pattern effect, independently of shadow effects, and to detect borders that appear when a screen, e.g. a multimedia tablet screen, is presented facing the sensors.

Thus, when acquisition is performed by the sensor 11 having a wide field angle, detection of a frame around a face of the target person is facilitated. In addition, when acquisition is performed by the sensor 12 having a narrow field angle, detection of a moiré effect is facilitated.

Naturally, the expressions "wide angle" and "narrow angle" do not correspond to general specifications but to specifications that are relative to each other.

The control unit 10 is programmed to control both sensors 11, 12 and to implement the method of the invention.

The method comprises a positioning stage, a fraud detection stage, and a recognition stage.

The positioning stage for positioning a candidate to face the second sensor 12 comprises the steps of:
  capturing at least one image by means of the first sensor 11;
  detecting a position of the candidate's face in said image; and
  using the position detected to determine at least one positioning indication to be provided to the candidate in order for the candidate to position his/her face in the field of the second sensor 12.

By way of example, this positioning indication takes the form of illuminating a bright arrow in the direction in which the candidate must move in order to bring the candidate's face into the field of view of the second sensor 12. To this end, the device includes an assistance system 14 for assisting with positioning the face 13 in front of the second sensor 12 by using the first sensor 11. In this embodiment, the assistance system comprises a screen 15 facing towards the candidate and connected to the control unit 10.

The fraud detection stage comprises the following steps:
  capturing at least one first image of the face 13 by means of the first sensor 11;
  capturing at least one second image of the face 13 by means of the second sensor 12;
  analyzing the first image to verify that there is no frame around the face 13;
  analyzing the second image to verify that there is no moiré effect; and
  validating the authenticity of the facial acquisition if the analyses reveal that there is no frame and no moiré.

The optical acquisitions are always performed in simultaneous manner.

It should be noted that the second image sensor 12 has an image resolution that is specifically adapted to detect a moiré effect when the face is at a distance that is too close to enable the first image sensor 11 to capture an outline around the face.

In a variant, acquisition and analysis are performed on a plurality of images from a video recording.

Still in a variant, both sensors 11, 12 are controlled in order to capture a plurality of images in the form of video recordings lasting several seconds.

To do so, the control unit 10 is programmed to perform an additional security check.

The method thus comprises the additional step of movement detection.

The recognition stage, itself known, comprises the steps of:
  detecting biometric characteristics in an image captured by the second sensor 12 (e.g. an image used for the fraud detection stage);
  comparing the detected biometric characteristics with biometric characteristics stored in a database to which the control unit 10 has access (the database containing stored biometric characteristics belonging to identified people);
  calculating a score reflecting the proximity between the detected biometric characteristics and the stored biometric characteristics of each identified person; and
  comparing the scores with a threshold in order to recognize the candidate.

Naturally, the invention is not limited to the embodiment described but covers any variant coming within the ambit of the invention as defined by the claims.

In particular, it is possible to select other specifications for the field angles and the resolutions of the respective image sensors 11 and 12.

The device may be incorporated in a telecommunications terminal.

The invention claimed is:

1. An automatic face recognition method, the method comprising a fraud detection stage including the following steps:
  acquiring at least one first image of the face by means of a first sensor having a first field angle;
  substantially simultaneously, acquiring at least one second image of the face by means of a second sensor having a second field angle, the sensors having fields of view covering a common zone in three-dimensional space, and the first field angle being wider than the second field angle;
  analyzing the first image only to detect border around the face;
  analyzing the second image to verify that there is no moiré effect;
  detecting the absence of fraud when there is no border detected in the first image and no moiré effect detected in the second image; and
  a positioning stage for positioning a candidate to face the second sensor, the positioning stage comprising the steps of capturing at least one image by means of the first sensor, of detecting a position of the candidate's face in said image, and of selecting at least one positioning indication in function of the detected position to be provided to the candidate in order to cause the candidate to position his/her face in the field of view of the second sensor.

2. The method according to claim 1, wherein the method further comprising a recognition stage that performs recognition by analyzing the second image.

3. An image capture device, comprising a control unit connected both to a first image sensor having a first field angle and also to a second image sensor having a second field angle, the sensors being pointed to have fields of view covering a common zone in three-dimensional space and the first field angle being wider than the second field angle, the control unit being arranged to implement a method comprising, during a fraud detection stage, the following steps:
  acquiring at least one first image of the face by means of a first sensor having a first field angle;
  substantially simultaneously, acquiring at least one second image of the face by means of a second sensor having a second field angle, the sensors having fields of view covering a common zone in three-dimensional space, and the first field angle being wider than the second field angle;

analyzing the first image only to detect border around the face;

analyzing the second image to verify that there is no moiré effect; and detecting the absence of fraud when there is no border detected in the first image and no moiré effect detected in the second image;

wherein the image capture device further comprises an assistance system for assisting with positioning the face in front of the second sensor by using the first sensor.

4. The device according to claim 3, wherein acquisition and analysis are performed on a plurality of images from a video recording.

5. The device according to claim 3, wherein the second image sensor has an image resolution that is specifically adapted to enable a moiré effect to be detected when the face is too close to the first sensor to enable the first image sensor to capture the outline of the face.

6. The device of claim 3, further comprising a communication unit.

7. The device according to claim 3, wherein the method further comprises a recognition stage that performs recognition by analyzing the second image.

8. An image capture device, comprising a control unit connected both to a first image sensor having a first field angle and also to a second image sensor having a second field angle, the sensors being pointed to have fields of view covering a common zone in three-dimensional space and the first field angle being wider than the second field angle, the control unit being arranged to implement a method comprising a fraud detection stage that includes the following steps:

acquiring at least one first image of the face by means of a first sensor having a first field angle;

substantially simultaneously, acquiring at least one second image of the face by means of a second sensor having a second field angle, the sensors having fields of view covering a common zone in three-dimensional space, and the first field angle being wider than the second field angle;

analyzing the first image only to detect border around the face; analyzing the second image to verify that there is no moiré effect;

detecting the absence of fraud when there is no border detected in the first image and no moiré effect detected in the second image; and a positioning stage for positioning a candidate to face the second sensor, the positioning stage comprising the steps of capturing at least one image by means of the first sensor, of detecting a position of the candidate's face in said image, and of selecting at least one positioning indication in function of the detected position to be provided to the candidate in order to cause the candidate to position his/her face in the field of view of the second sensor.

9. The device according to claim 8, including an assistance system for assisting with positioning the face in front of the second sensor by using the first sensor.

10. The device according to claim 8, wherein the second image sensor has an image resolution that is specifically adapted to enable a moiré effect to be detected when the face is too close to the first sensor to enable the first image sensor to capture the outline of the face.

11. The device of claim 8, further comprising a communication unit.

* * * * *